United States Patent
Boday et al.

(10) Patent No.: US 9,303,186 B1
(45) Date of Patent: *Apr. 5, 2016

(54) PHT POWDER COATING MATERIALS

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,139

(22) Filed: Oct. 16, 2014

(51) Int. Cl.
| C09D 179/04 | (2006.01) |
| C09D 181/02 | (2006.01) |
| C09D 179/06 | (2006.01) |
| C09D 5/03   | (2006.01) |

(52) U.S. Cl.
CPC .............. *C09D 179/04* (2013.01); *C09D 5/03* (2013.01); *C09D 179/06* (2013.01); *C09D 181/02* (2013.01)

(58) Field of Classification Search
CPC ....... C09D 179/04; C09D 179/06; C09D 5/03
See application file for complete search history.

(56) References Cited

U.S. PATENT DOCUMENTS

| 2,889,277 A | 6/1959 | Hughes |
| 3,340,232 A | 9/1967 | Smith et al. |
| 3,598,748 A | 8/1971 | Hirosawa et al. |
| 3,957,742 A | 5/1976 | Kveton |
| 4,093,787 A * | 6/1978 | Burgess et al. ................ 526/62 |
| 4,106,904 A | 8/1978 | Oude Alink et al. |
| 4,224,417 A * | 9/1980 | Hajek et al. .................. 521/166 |
| 4,225,481 A * | 9/1980 | Wagner ......................... 524/765 |
| 4,246,160 A * | 1/1981 | Wagner et al. ................ 524/387 |
| 4,301,262 A | 11/1981 | Wagner et al. |
| 4,877,451 A | 10/1989 | Winnik et al. |
| 5,112,796 A | 5/1992 | Iannicelli |
| 5,347,004 A * | 9/1994 | Rivers et al. ................... 544/180 |
| 5,674,377 A | 10/1997 | Sullivan, III et al. |
| 5,830,243 A * | 11/1998 | Wolak et al. ..................... 44/336 |
| 7,384,434 B2 | 6/2008 | Malfer et al. |
| 2005/0121114 A1* | 6/2005 | Fernandez Gonzalez et al. ............................ 148/252 |
| 2010/0107476 A1* | 5/2010 | Cosimbescu .................. 44/334 |
| 2012/0049308 A1 | 3/2012 | Nishimura et al. |
| 2013/0118996 A1* | 5/2013 | Kaplan ........................ 210/749 |
| 2015/0104579 A1* | 4/2015 | Hendrick et al. ............ 528/149 |

FOREIGN PATENT DOCUMENTS

| CN | 101265255 A | 9/2008 |
| EP | 2636697 A1 | 9/2013 |
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

Kuhn et al. Angew. Chem. Int. Ed. 2008, 47, pp. 3450-3453.*
ICIS Special Report. Obtained online from http://www.icis.com/resources/news/2014/06/06/9789051/special-report-ibm-reveals-recyclable-thermosets/. No author, dated Jun. 6, 2014.*
Ang Yulan and Lu Fengcai, Synthesis and Properties of Polu-1,3,5-Triazines, Polymer Communications, 1984, 7 pages, No. 2, Institute of Chemistry, Academia Sinica, Bejing.
Margit Hiller and Sergey E. Evsyukov, Laser-Engravable Hexahydrotriazine Polmer Networks, Published Online, Aug. 16, 2002.
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702.
T. Okita, Filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.

(Continued)

*Primary Examiner* — Michael A Salvitti
(74) *Attorney, Agent, or Firm* — Patterson & Sheridan, LLP

(57) ABSTRACT

A coating for an article may be made by applying a powder of a polyhemiaminal (PHA) polymer material to the article in a particulate form and then converting the PHA polymer material to a polyhexahydrotriazine (PHT) polymer material and fusing the particles into a monolithic coating by applying heat to the particles. The method generally includes forming a dilute reaction mixture comprising a formaldehyde reactant, a solvent, a primary aromatic diamine, and heating the reaction mixture to a temperature of between about 20° C. and about 120° C. for a short time to form a polymer. A particulate solid is precipitated by adding an excess volume of a nonsolvent to the mixture. The powder may be applied to an article and then heated to fuse the powder into a coating and convert the PHA to PHT.

5 Claims, No Drawings

(56) References Cited

OTHER PUBLICATIONS

Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.

Ferrar, "Reactions of Formaldehyde With Aromatic Amines," J. Appl. Chem, 14, 1964, 389-399.

Geng, et al., "Nanoindentation behavior of ultrathin polymeric films," Polymer 46 (2005) 11768-11772; Available online Oct. 19, 2005.

Oliver, et al. "Measurement of hardness and elastic modulus by; instrumented indentation: Advances in understanding and; refinements to methodology," J. Mater. Res., vol. 19, No. 1, Jan. 2004, 3-20.

Singh, et al., "Ultrasound mediated Green Synthesis of Hexa-hydro Triazines," J. Mater. Environ. Sci. 2 (4) (2011) 403-406.

Stafford, et al., "A buckling-based metrology for measuring; the elastic moduli of polymeric thin films," Nature Materials Aug. 3, 2004, 545-550;Published online: Jul. 11, 2004.

List of IBM Patents or Patent Applications Treated As Related.

* cited by examiner

PHT POWDER COATING MATERIALS

BACKGROUND

Powder coatings are commonly used to form a protecting coating on a substrate. A powder is applied to a substrate, often using volatile organic solvents, the solvent is removed, and the powder is cured to fuse the powder particles into a monolithic coating that covers the substrate. Powder coatings can extend the lifetime of hardware through corrosion protection, abrasion resistance, and protection from chemical attack.

Currently, polymeric coatings function primarily as passive structures. Their function and value proceed from their mechanical properties. When worn or damaged after a time of use, today's polymeric coatings must be reapplied. Moreover, application of powder coatings using organic solvents is becoming increasingly disfavored as scrutiny increases over use of such solvents.

A strong coating material is needed that can be applied as a powder, cured into a coating, and subsequently repaired in place without adding additional material.

SUMMARY

Embodiments described herein relate to powder coatings comprising a polyhexahydrotriazine, methods of making a powder, and methods of coating an article. A method of making a powder includes forming a first mixture of i) a monomer having two or more primary aromatic amine groups; ii) an optional monovalent monomer having a primary amine group; iii) a formaldehyde reactant; and iv) a solvent, wherein a concentration of the monomer is about 10 mM or less; heating the first mixture at a temperature of about 20° C. to about 120° C. for a duration less than about 10 minutes to form a second mixture comprising a polyhemiaminal polymer; precipitating a particulate solid from the second mixture by adding a non-solvent to the second mixture; and drying the particulate solid to form a powder. A method of coating an article includes applying a powder to a surface of the article, the powder comprising a polyhemiaminal polymer; heating the powder at a temperature between about 190° C. and about 250° C.; flowing the polyhemiaminal polymer to form a coating on the surface; and converting the polyhemiaminal polymer to a polyhexahydrotriazine polymer.

DETAILED DESCRIPTION

A coating for an article may be made by applying a powder of a polyhemiaminal polymer material to the article in a particulate form and then converting the polyhemiaminal (PHA) polymer material to a polyhexahydrotriazine (PHT) polymer material and fusing the particles into a monolithic coating by applying heat to the particles.

A PHA is a polymer that includes a plurality of trivalent hemiaminal (HA) groups having the structure of formula (1)

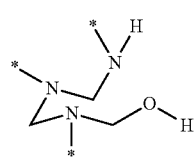

(1)

covalently linked to a plurality of the bridging groups of formula (2)

(2)

wherein y' is 2 or 3, and K' is a divalent or trivalent radical. In this disclosure, starred bonds represent attachment points to other portions of the chemical structure. The structure of formula (1) is a hemiaminal (HA) group, and each starred bond of a given HA group is covalently linked to a respective one of the bridging groups. Additionally, each starred bond of a given bridging group is covalently linked to a respective one of the HA groups.

As an example, a polyhemiaminal can be represented herein by formula (3):

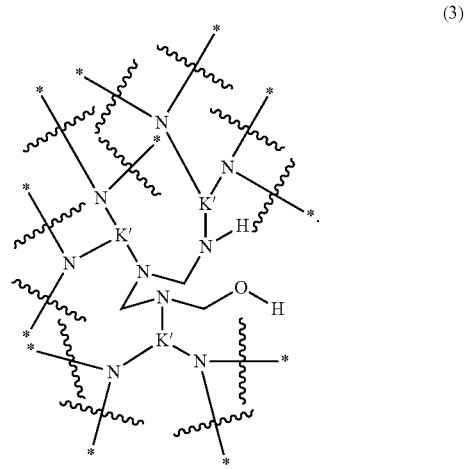

(3)

In this instance, each K' is a trivalent radical (y'=3) comprising at least one 6-carbon aromatic ring. It should be understood that each nitrogen having two starred wavy bonds in formula (3) is a portion of a different hemiaminal group.

The structure of formula (3) can also be represented using the notation of formula (4):

(4)

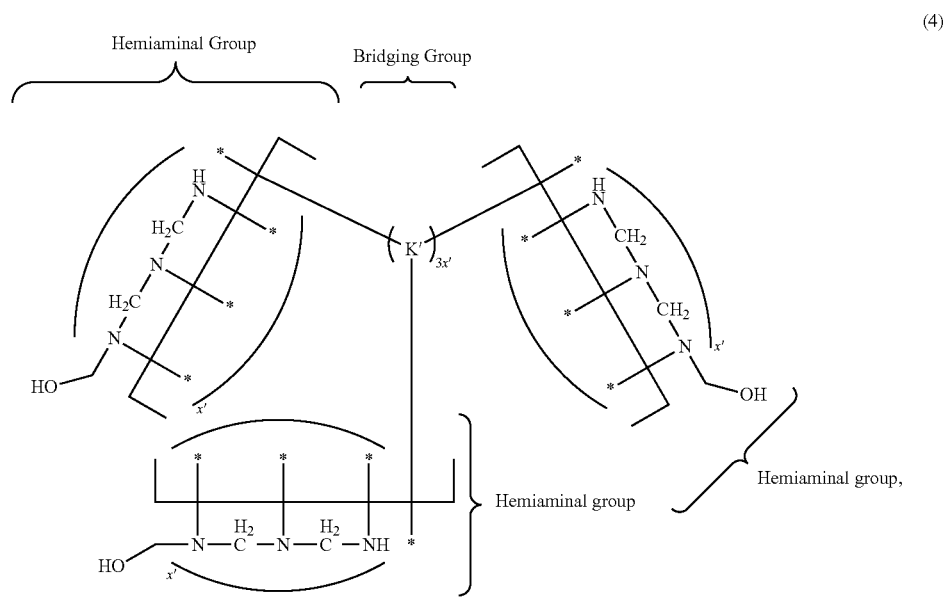

wherein x' is moles and each bridging group K' is a trivalent radical (y'=3 in formula (2)) comprising at least one 6-carbon aromatic ring. It should be understood that each starred nitrogen bond of a given hemiaminal group of formula (4) is covalently linked to a respective one of the bridging groups K'. Additionally, each starred bond of a given bridging group K' of formula (4) is covalently linked to a respective one of the hemiaminal groups.

Trivalent bridging groups K' that may be part of a PHA network include the following structures:

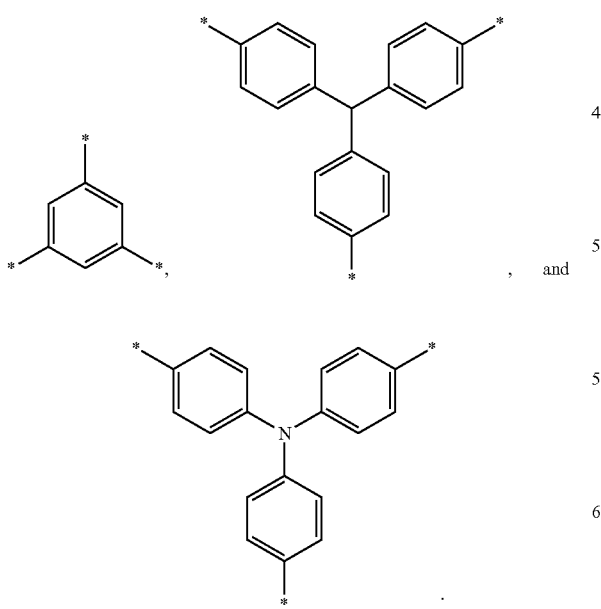

The trivalent bridging groups can be used singularly or in combination.

Polyhemiaminals composed of divalent bridging groups K' can be represented herein by formula (5):

(5)

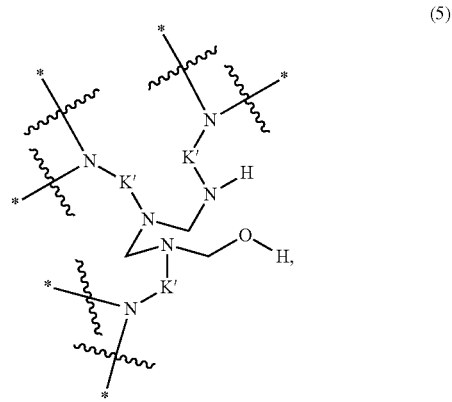

wherein K' is a divalent radical (y'=2 in formula (2)) comprising at least one 6-carbon aromatic ring. Each nitrogen having two starred wavy bonds in formula (5) is a portion of a different hemiaminal group.

Divalent bridging groups usable for the PHA powder material may have at least one 6-carbon aromatic ring. A category of such divalent bridging groups may be represented by the structure of formula (6)

(6)

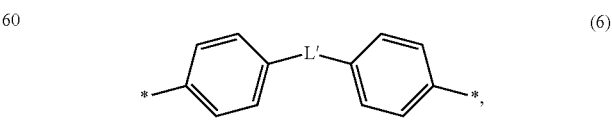

wherein L' is a divalent linking group selected from the group consisting of *—O—*, *—S—*, *—N(R')—*,

*—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

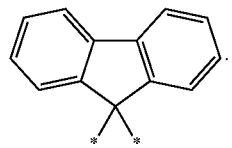 [SMILES: *C1(*)c2ccccc2-c2ccccc21]

Other divalent bridging groups that may be used include:

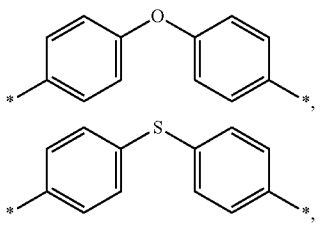

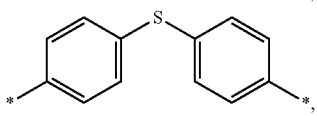

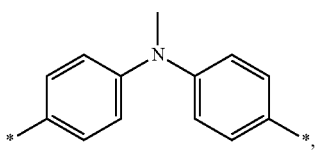

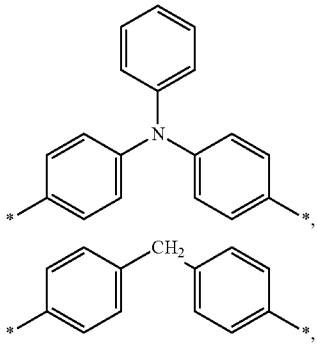

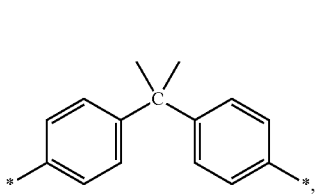

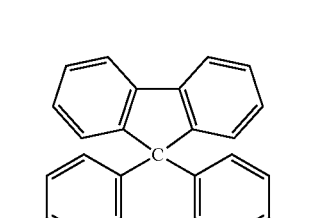

and combinations thereof.

Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

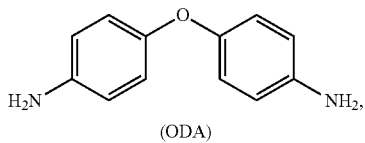

(ODA)

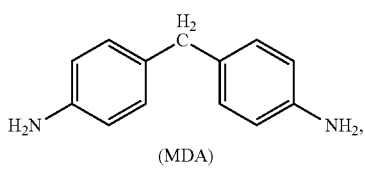

(MDA)

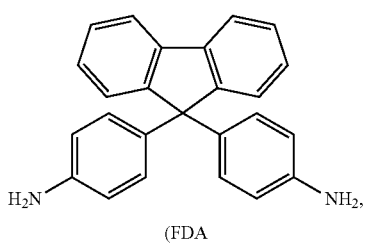

(FDA

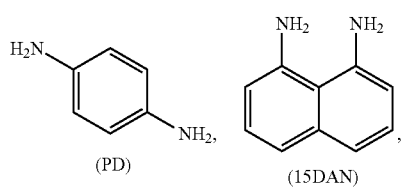

(PD)          (15DAN)

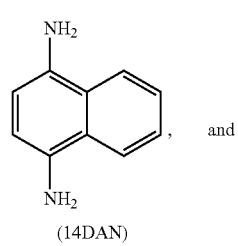

(14DAN)

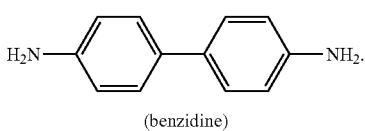

(benzidine)

Polyhemiaminals composed of divalent bridging groups of formula (6) can be represented herein by formula (7):

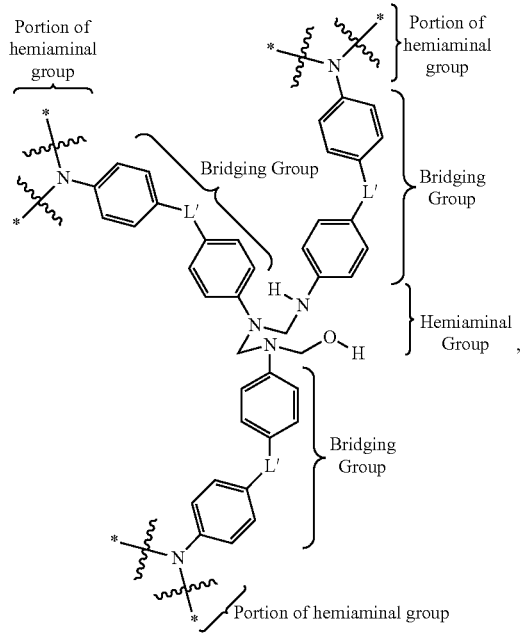

(7)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (7) is a portion of a different hemiaminal group.

The polyhemiaminal of formula (7) can also be represented by the notation of formula (8):

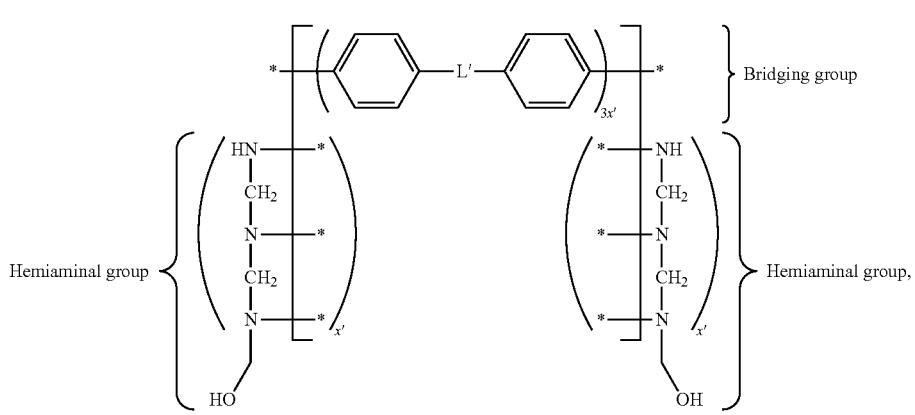

(8)

wherein x' is moles, and L' is a divalent linking group selected from the group consisting of *—O—*, *—S—*, *—N(R)—*, *—N(H)—*, *—R"—*, and combinations thereof, wherein R' and R" independently comprise at least 1 carbon. Each starred nitrogen bond of a given hemiaminal group of formula (8) is covalently linked to a respective one of the bridging groups. Additionally, each starred bond of a given bridging group of formula (8) is covalently linked to a respective one of the hemiaminal groups.

Monovalent substituents M' may also be used in the PHA powder material. Such monovalent substituents may have the structure of formula (9), formula (10), formula (11), or formula (12):

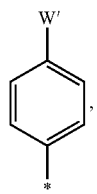

(9)

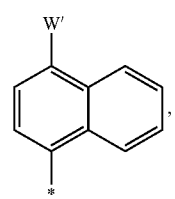

(10)

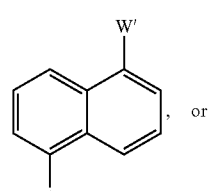

(11)

, or

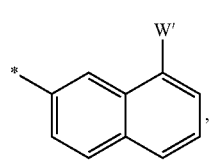

(12)

wherein W' is a monovalent radical selected from the group consisting of *—N($R^1$)($R^2$), —$OR^3$, —$SR^4$, wherein $R^1$, $R^2$, $R^3$, and $R^4$ are independent monovalent radicals comprising at least 1 carbon. As noted above, the starred bond is linked to a nitrogen of a HA group. Non-limiting exemplary monovalent groups having the structures of formulas 4-7 include:

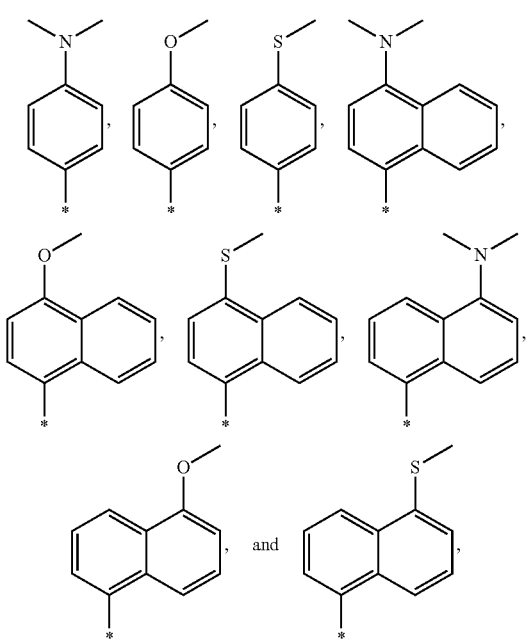

wherein the starred bond is defined as above. Monovalent groups can be used singularly or in combination.

Non-limiting exemplary monomers that give rise to monovalent groups in a porous network include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

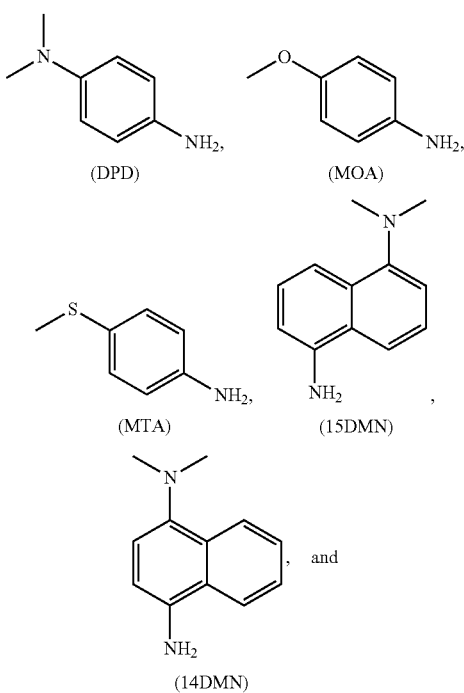

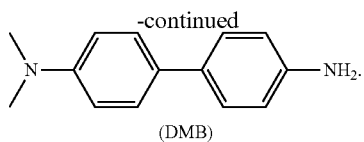

A PHA material having a mixture of mono-, di-, and trivalent substituents may have the structure of formula (13):

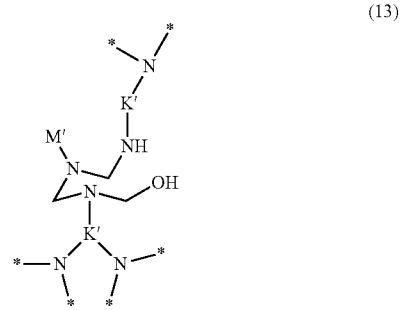

wherein K' and M' are defined as above.

The PHA network may be non-covalently bonded with water through hydrogen bonding, or with another solvent. A PHA complex with water has the general structure of formula (14)

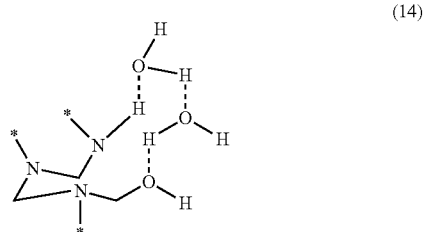

where the stars represent bonds to other atoms in the network, as described above.

A PHA powder material may be made by forming a PHA network in solution and then precipitating small particles of the PHA network by adding a large excess of a non-solvent to the solution. A PHA network is generally made by forming a reaction mixture of one or more primary amines with a formaldehyde reactant, which may be formaldehyde, one or more oligomers of formaldehyde, or a mixture thereof. To form a network the one or more primary amines includes at least a primary diamine or a primary triamine that includes an aromatic group. Thus, a method of preparing a PHA network includes forming a first mixture of i) a monomer having two or more primary aromatic amine groups; ii) an optional monovalent monomer having a primary amine group; iii) a formaldehyde reactant; and iv) a solvent. The first mixture is heated at a temperature of about 20° C. to about 120° C. for about 1 minute to about 24 hours, thereby forming a second mixture comprising the PHA network. The reaction may be performed using stoichiometric quantities of aldehyde and amine, or with molar excess of aldehyde. For example, the reaction may be performed at a ratio of aldehyde moles to amine moles of about 1:1 to about 1.25:1.

A PHA powder material may be formed using the above process by performing the reaction under dilute conditions for a short time, such as less than about 10 minutes, for example about 2 minutes, and then precipitating using a large excess, for example a volume of ten times the volume of the reaction mixture, of a non-solvent such as methanol. Other precipitating agents that may be used include isopropanol, or other low-boiling alcohols, acetone, or other low boiling ketones, dimethyl sulfoxide (DMSO), tetrahydrofuran (THF), and dimethyl formamide (DMF), among others. Dilute conditions are such that no more than about 20% solids by weight, for example from about 0.5% to about 20% by weight, are obtained. The powder may be isolated by any convenient separation method or combination thereof, including filtering, centrifuging, and drying at temperatures less than about 120° C., under vacuum if desired. The powder may have average particle size between about 10 nm and about 100 µm, for example about 50 µm. Average particle size may be controlled by adjusting the time between combining the reactants and quenching the reaction and precipitating with non-solvent. A shorter time results in smaller particles. Particle size can also be controlled by adjusting concentration of reactants, with a more dilute reaction resulting in smaller particle size.

The powder may be applied to an article to be coated using any convenient means. The powder may be sprayed onto the article using a gas propellant, flowed over the article by positioning the article on a screen and dispensing the powder over the article, or by any other convenient method. Adhesion of the powder to the article may be enhanced by electrostatic means or by using a compatible adhesive coating applied to the article prior to exposure to the powder.

The powder may also be applied to the article as an aqueous dispersion, for example as a colloid. A surfactant may be added to the powder to prevent agglomeration in the dispersion, either at the time the powder is precipitated from the reaction mixture or after the powder is precipitated and/or removed from the solvent. The surfactant may be an ionic or non-ionic surfactant. Polyetheramine surfactants, such as the JEFFAMINE® surfactants available from the Performance Products division of Huntsman Corporation, located in The Woodlands, Tex., may be used. About 1-2% by weight of a surfactant may be added to the reaction mixture prior to precipitating the powder, and the powder and surfactant may be co-precipitated. The surfactant may be added to the two-phase powder-in-solvent mixture after precipitating the powder. The surfactant may be added to the powder after removal from the solvent mixture. Finally, the surfactant may be added to the aqueous dispersion before or after adding the powder. After applying the aqueous dispersion to the article, the liquid is dried to adhere the powder to the article, and the powder is then cured as described above.

The powder thus applied to the article may then be cured to form a monolithic coating. The powder may be heated at a temperature of about 190° C. to about 250° C. for 30 minutes to 6 hours to cure the powder into a monolithic coating. In one embodiment, the temperature is ramped slowly up to about 220° C. to cure the coating. During the curing process, the PHA network of the powder is converted to a PHT network, and the particles are fused into a continuous coating. Heating the powder also transforms the powder into a flowable material and flowing the flowable material along the surface of the article to form a continuous coating.

A PHT is a crosslinked polymer comprising i) a plurality of trivalent hexahydrotriazine (HT) groups of formula (15):

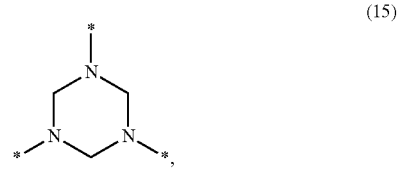

(15)

covalently linked to ii) a plurality of the bridging groups K' of formula (2), with the starred bonds defined as above, and optionally covalently linked to iii) one or more of the monovalent groups M' above. A PHT having a mixture of mono-, di-, and trivalent substituents may have the structure of formula (16):

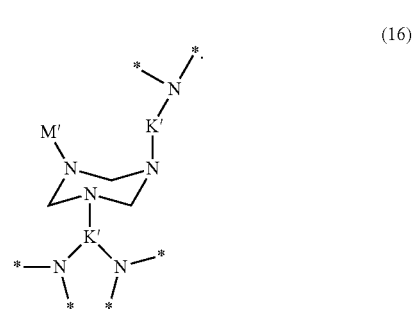

(16)

For PHTs comprising bridging groups of formula (6), the polyhexahydrotriazine is represented herein by formula (17):

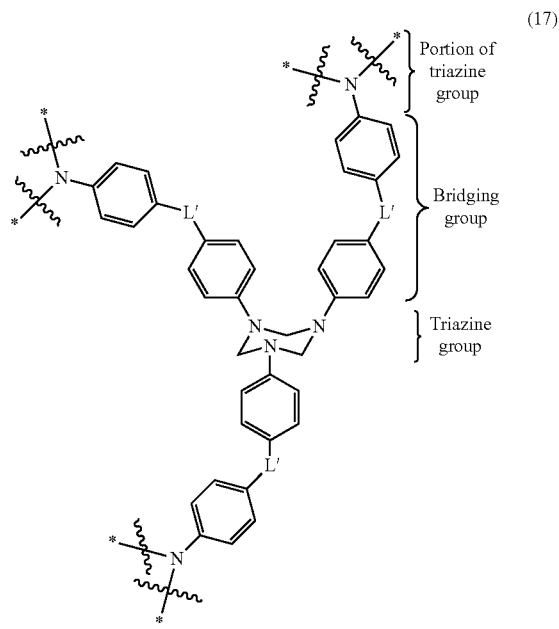

(17)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (11) is a portion of a different hexahydrotriazine group. The divalent groups described above may be used to make the structure of formula (17). The monovalent groups described above may also be included.

A PHT may also represented herein by the notation of formula (18):

Divalent polymer bridging groups generally have the formula *—Q—*, where Q is a vinyl polymer chain, a polyether chain, a polyester chain, a polyimide chain, a polyamide chain, a polyurea chain, a polyurethane chain, a polyaryl ether sulfone chain, a polybenzoxazole chain, a polybenimidazole

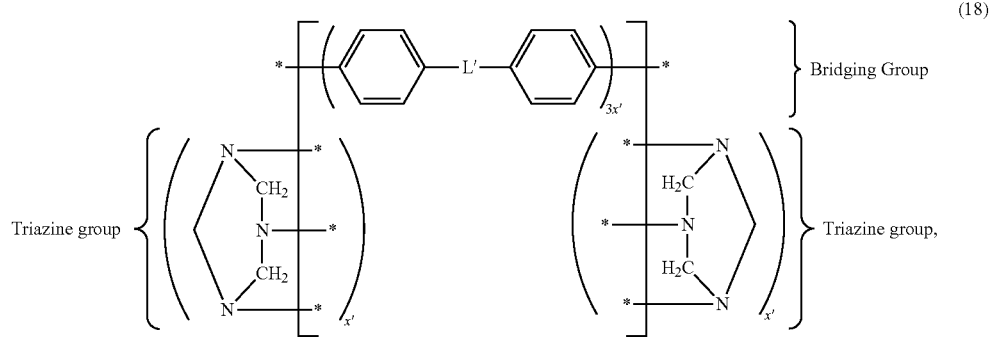

(18)

wherein x' is moles, L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon.

A coating made from a PHT network is lightweight, rigid, and strong, with Young's modulus of 6 to 14 GPa. The number average molecular weight (Mn) of the PHA and/or PHT polymers can be in a range of 1000 to 100,000, preferably in a range of 1000 to 50,000, and most preferably in a range of 1000 to 20,000. The modulus of the polymer can be adjusted by using more or less monovalent species to control the degree of crosslinking.

Mechanical properties of the coating may be adjusted by adding different bridging groups K'. Plasticity and/or resiliency may be added to the coating by including thermoplastic bridging groups K' in the PHA powder. The thermoplastic bridging groups K' are generally divalent thermoplastic polymer groups of the form *—Q—* each having a molecular weight of at least 1000 g/mole, wherein each starred bond of each thermoplastic polymer group is covalently linked to a starred bond of a hemiaminal group in the PHA powder, and a hexahydrotriazine group in the cured coating. Such bridging groups may be included in the PHA powder by including polymer diamine reactants in the reaction mixture. A useful polymer diamine reactant is generally a diamine terminated polymer, such as a diamine terminated vinyl polymer, a diamine terminated polyether, a diamine terminated polyester, a diamine terminated star polymer, a diamine terminated polyaryl ether sulfone, a diamine terminated polybenzoxazole polymer, a diamine terminated polybenimidazole polymer, a diamine terminated epoxy resin, a diamine terminated polysiloxane polymer, a diamine terminated polybutadiene polymer, and a diamine terminated butadiene copolymer. Diamine terminated polyethers are commercially available from suppliers such as Huntsman Corp. Diamine terminated vinyl polymers include long-chain alkyl diamines which may be referred to as polyalkylene diamines, for example polyethylene diamine, polypropylene diamine, and other such polymer diamines. Diamine terminated vinyl polymers also include long-chain polymer diamines with cyclic and/or aromatic components, such as diamine terminated polystyrene. The diamine terminated polymers and oligomers referred to above are commercially available, or may be readily synthesized through well-known reaction pathways.

chain, an epoxy resin, a polysiloxane chain, a polybutadiene chain, and butadiene copolymer, or a combination thereof. Typically, a divalent polymer bridging group of these materials will have a molecular weight that is at least 1000 g/mole. The polymer bridging groups used in embodiments described herein typically come from mixtures of polymer diamine molecules having the general formula $H_2N$-Q-$NH_2$ having a distribution of molecular weights. Molecular weight of a polymer mixture is usually expressed in terms of a moment of the molecular weight distribution of the polymer mixture, defined as $$M_z = \frac{\sum m_i^z n_i}{\sum m_i^{z-1} n_i},$$

where $m_i$ is the molecular weight of the ith type of polymer molecule in the mixture, and $n_i$ is the number of molecules of the ith type in the mixture. $M_1$ is also commonly referred to as $M_n$, the "number average molecular weight". $M_2$ is also commonly referred to as $M_w$, the "weight average molecular weight". The polymer mixtures used to obtain divalent polymer bridging groups in the materials described herein may have $M_1$ of at least about 1000 g/mol.

Molecular weight distribution of a polymer mixture may be indicated by a polydispersity ratio $P_z$, which may be defined as $$P_z = \frac{M_{z+1}}{M_z},$$

where $M_z$ is defined above. The polymer bridging groups used in embodiments described herein typically come from polymer molecule mixtures having a polydispersity ratio $P_1$ of about 1-3, for example about 2.

In one embodiment, the polyaryl ether sulfone polymer of formula (19) for use in forming a PHT or PHA network may be prepared by reacting a bis-haloaryl sulfone, a diol such as bisphenol A, and an aminophenol such as 1,4-aminophenol in the presence of a base.

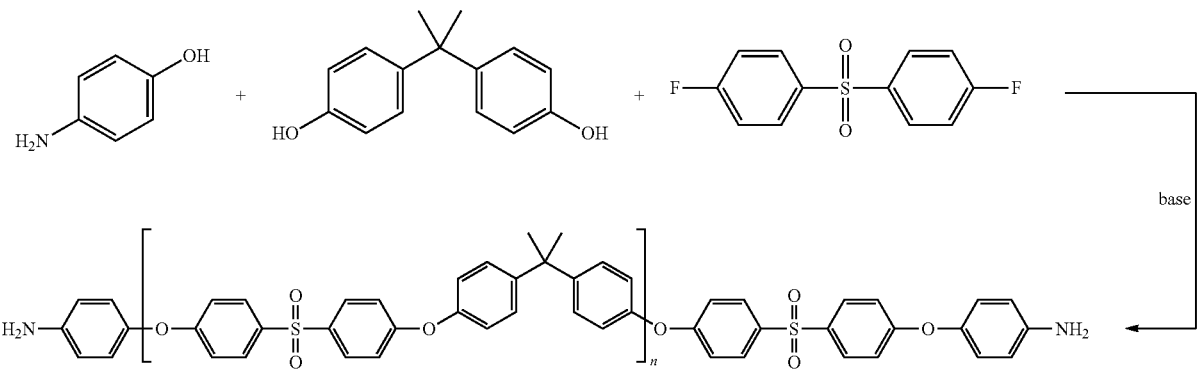

(19)

The reaction may be performed in a dipolar aprotic solvent such as N-methyl-2-pyrrolidone (NMP), dimethylsulfoxide (DMSO), N,N-dimethylformamide (DMF), N,N-dimethylacetamide (DMA), propylene carbonate (PC), and/or propylene glycol methyl ether acetate (PGMEA). The sulfone and diol form a polymer terminated by halogen atoms, and the 1,4-aminophenol replaces the halogen atoms to leave an amine-terminated sulfone polymer. The reaction of the sulfone and diol is performed in the presence of a base, such as potassium carbonate. Molecular weight of the sulfone polymer molecules can be controlled by providing a slight excess of one reactant according to the Carothers equation. Addition of the aminophenol stops the polymerization reaction by removing the reactive halide ends.

Other amine-terminated polymers that may be used as precursors for a PHA or PHT reaction include bis-amino polyethers, which are commercially available or may be prepared by polymerizing an alkylene oxide to a polyalkylene glycol, and then aminating the polyalkylene glycol. A wide variety of reaction pathways are known for producing diamine terminated polymers and oligomers.

Coatings made from PHT and PHA polymers also have the property that scratches and other damage to the coating can be repaired without depositing more material. PHT and PHA polymers can be decomposed to monomers under acidic conditions with pH<1. A coating that includes PHT and PHA polymers can be treated with a mild acid solution that has pH<1 on a surface of the coating to loosen the surface of the coating by depolymerizing the surface of the coating. If desired, the acid can then be neutralized, solvent added to the loosened material on the surface of the coating, and the material heated to re-polymerize. The monomers may be allowed to flow along the surface, smoothing any unwanted features in the surface and filling any scratches, holes, or other damage before re\-polymerizing. Alternately, if desired, depolymerized material may be removed using acid, and replaced with new monomers, and then re-polymerized. In this way, a coating that includes PHA or PHT polymers can be repaired.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A powder coating comprising a polyhexahydrotriazine.

2. The powder coating of claim 1, wherein the polyhexahydrotriazine is a material having a plurality of hexahydrotriazine groups with the general structure

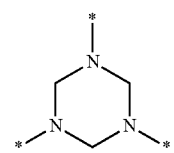 [SMILES: *N1CN(*)CN(*)C1]

wherein at least one starred bond of each hexahydrotriazine unit is covalently linked to a divalent linking group, and each divalent linking group is covalently linked to two hexahydrotriazine units.

3. The powder coating of claim 2, wherein each divalent linking group has the structure

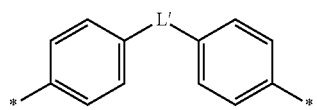

wherein L' is a divalent linking group selected from the group consisting of *—O—*, *—S—*, *—N(R')—*, *—N(H)—*, *—R"—*, and combinations thereof, wherein R' and R" independently comprise at least 1 carbon, and each starred bond of each divalent linking group is covalently bonded to a respective starred bond of a hexahydrotriazine unit.

4. The powder coating of claim 3, wherein the polyhexahydrotriazine further comprises a plurality of monovalent groups, wherein each monovalent group is covalently linked to a hexahydrotriazine group.

5. An article comprising the powder coating of claim 3.

* * * * *